United States Patent
Sun et al.

(10) Patent No.: US 10,577,489 B2
(45) Date of Patent: Mar. 3, 2020

(54) PROCESS FOR FOAMING POLYOLEFIN COMPOSITIONS USING AN AZODICARBONAMIDE/CITRATE MIXTURE AS A NUCLEATING AGENT

(71) Applicant: Dow Global Technologies LLC, Midland, MI (US)

(72) Inventors: Gangwei Sun, Shanghai (CN); Mohamed Esseghir, Collegeville, PA (US); Xianmin Xu, Shanghai (CN); Chester J. Kmiec, Phillipsburg, NJ (US)

(73) Assignee: Dow Global Technologies LLC, Midland, MI (US)

( * ) Notice: Subject to any disclaimer, the term of this patent is extended or adjusted under 35 U.S.C. 154(b) by 154 days.

(21) Appl. No.: 15/562,028

(22) PCT Filed: May 8, 2015

(86) PCT No.: PCT/CN2015/078590
§ 371 (c)(1),
(2) Date: Sep. 27, 2017

(87) PCT Pub. No.: WO2016/179754
PCT Pub. Date: Nov. 17, 2016

(65) Prior Publication Data
US 2018/0105684 A1   Apr. 19, 2018

(51) Int. Cl.
| | | |
|---|---|---|
| C08K 5/098 | (2006.01) |
| C08L 23/06 | (2006.01) |
| C08J 9/00 | (2006.01) |
| C08J 9/10 | (2006.01) |
| B29C 48/285 | (2019.01) |
| H01B 3/44 | (2006.01) |
| B29C 48/40 | (2019.01) |
| C08K 3/26 | (2006.01) |
| C08K 5/092 | (2006.01) |
| C08K 5/23 | (2006.01) |
| C08L 23/26 | (2006.01) |

(52) U.S. Cl.
CPC .......... *C08L 23/06* (2013.01); *B29C 48/2886* (2019.02); *B29C 48/40* (2019.02); *C08J 9/0023* (2013.01); *C08J 9/0028* (2013.01); *C08J 9/0052* (2013.01); *C08J 9/0061* (2013.01); *C08J 9/103* (2013.01); *C08K 3/26* (2013.01); *C08K 5/092* (2013.01); *C08K 5/098* (2013.01); *C08K 5/23* (2013.01); *C08L 23/26* (2013.01); *H01B 3/441* (2013.01); *C08J 2205/04* (2013.01); *C08J 2323/06* (2013.01); *C08J 2423/06* (2013.01); *C08K 2003/262* (2013.01); *C08L 2203/14* (2013.01); *C08L 2205/025* (2013.01); *C08L 2207/062* (2013.01); *C08L 2207/066* (2013.01)

(58) Field of Classification Search
CPC .......................... C08K 5/23–26; C08K 5/098
See application file for complete search history.

(56) References Cited

U.S. PATENT DOCUMENTS

| | | | |
|---|---|---|---|
| 5,032,621 A | 7/1991 | Buckmaster et al. | |
| 5,180,754 A | 1/1993 | Morita et al. | |
| 5,225,107 A * | 7/1993 | Kretzschmann | ....... C08J 9/0023 516/11 |
| 5,770,819 A | 6/1998 | Mehan | |
| 5,837,173 A | 11/1998 | Vita et al. | |
| 6,037,545 A * | 3/2000 | Fox | ....... H01B 11/1826 174/110 R |
| 6,121,335 A | 9/2000 | Higashikubo et al. | |
| 6,127,441 A | 10/2000 | Sakamoto et al. | |
| 6,160,029 A | 12/2000 | Chaudhary et al. | |
| 6,492,596 B1 | 12/2002 | Higashikubo et al. | |
| 6,512,013 B2 | 1/2003 | Hrivnak | |
| 7,767,725 B2 | 8/2010 | Brix et al. | |
| 2004/0138318 A1 | 7/2004 | McClelland et al. | |
| 2006/0106135 A1 | 5/2006 | Gan et al. | |
| 2008/0103221 A1 | 5/2008 | Weinbeck et al. | |
| 2009/0018225 A1 | 1/2009 | Gemmel et al. | |
| 2013/0090398 A1 | 4/2013 | Glew et al. | |

FOREIGN PATENT DOCUMENTS

| | | |
|---|---|---|
| CA | 2523861 A1 | 11/2004 |
| CN | 104558780 A | 4/2015 |
| JP | 2000204203 A | 7/2000 |
| JP | 2000344927 A | 12/2000 |
| JP | 2006339099 A | 12/2006 |
| JP | 4879613 | 2/2012 |
| WO | 2007/071274 A1 | 6/2007 |

OTHER PUBLICATIONS

Machine translation of JP 2004-349160 by Nakamura et al (Year: 2004).*
Derwent abstract of JP 2004-349160 by Nakamura et al (Year: 2004).*
PCT/CN2015/078590, International Search Report and Written Opinion dated Feb. 15, 2016.

(Continued)

*Primary Examiner* — Kara B Boyle
*Assistant Examiner* — Christina H. W. Rosebach

(57) ABSTRACT

A process of foaming a polyolefin, e.g., polyethylene, composition using as a nucleator a combination of (A) azodicarbonamide, and (B) a mixture of (1) a first component consisting of at least one of citric acid and an alkali metal citrate, and (2) a second component consisting of at least one of an alkali metal citrate, a di-alkali metal hydrogen citrate, an alkali metal dihydrogen citrate and an alkali metal bicarbonate, with the proviso that the mixture is not solely composed of alkali metal citrate.

6 Claims, No Drawings

(56) References Cited

OTHER PUBLICATIONS

PCT/CN2015/078590, International Preliminary Report on Patentability dated Nov. 14, 2017.
EP15891457.2, Extended European Search Report dated Nov. 26, 2018.

* cited by examiner

PROCESS FOR FOAMING POLYOLEFIN COMPOSITIONS USING AN AZODICARBONAMIDE/CITRATE MIXTURE AS A NUCLEATING AGENT

FIELD

Various embodiments of the present invention relate to a process of foaming compositions. In one aspect, the invention relates to foaming polyolefin compositions using an azodicarbonamide and a citrate mixture as a nucleating agent, while in another aspect, the invention relates to the foamed composition made from the process. In yet another aspect, the invention relates to using the foamed compositions as an insulation layer in electric communication cables, particularly high-frequency coaxial cables.

INTRODUCTION

Typically, the insulation layer of a high-frequency telecommunications cable is produced by mixing a nucleating agent with a mixture of high-density polyethylene ("HDPE") and low-density polyethylene ("LDPE"). The foamable materials are then extruded in the presence of a physical foaming agent (e.g., gases, such as nitrogen, carbon dioxide, chlorinated fluorocarbons, treons, helium, neon, argon, krypton, xenon, and radon) that is injected into the polymer melt inside the extruder. Nucleating agents for foaming can include, but are not limited to, azodicarbonamide ("ADCA") and 4,4'-oxybisbenzenesulfonylhydrazide ("OBSH"), which thermally decompose in an extruder and form a number of fine nuclei in the polymer melt. However, the byproducts of the decomposed ADCA and OBSH have high polarity, which can have a significant negative effect on the electrical performance (dissipation factor) of the cable. Although advances have been made in the art of nucleating agents for foaming polyolefins, improvements are still desired.

SUMMARY

One embodiment is a process of foaming a polyolefin using as a nucleator a combination of:
(A) azodicarbonamide ("ADCA"), and
(B) a mixture of:
  (1) a first component consisting of at least one of citric acid and an alkali metal citrate, and
  (2) a second component consisting of at least one of an alkali metal citrate, a di-alkali metal hydrogen citrate, an alkali metal di-hydrogen citrate, and an alkali metal bicarbonate, with the proviso that said mixture is not solely composed of alkali metal citrates,
wherein said polyolefin and said nucleator are present as components in a foamable polyolefin composition,
wherein said ADCA and said mixture are present in an ADCA-to-mixture weight ratio ranging from less than 80:20 to greater than 15:85.

Another embodiment is a foamable polyolefin composition comprising in weight percent based on the total weight of the foamable polyolefin composition:
(A) 45 to 95 weight percent HDPE;
(B) 4 to 54 weight percent LDPE;
(C) 0.03 to 0.09 weight percent ADCA; and
(D) 0.06 to 0.12 weight percent of a mixture of
  (1) a first component consisting of at least one of citric acid and an alkali metal citrate, and
  (2) a second component consisting of at least one of an alkali metal citrate, a di-alkali metal hydrogen citrate, an alkali metal di-hydrogen citrate, and an alkali metal bicarbonate, with the proviso that said mixture is not solely composed of alkali metal citrates.

DETAILED DESCRIPTION

Various embodiments of the present invention concern a foamable polyolefin composition comprising a polyolefin and a nucleator. Further embodiments concern a process for foaming a foamable polyolefin composition and the resulting foamed polyolefin composition. Additionally, various embodiments concern articles of manufacture prepared from such foamed polyolefin compositions, such as insulation layers in telecommunication cables.

Polyolefin

As just noted, the foamable polyolefin compositions described herein comprise a polyolefin. "Polyolefin" means a polymer derived from one or more simple olefin monomers, e.g., ethylene, propylene, 1-butene, 1-hexene, 1-octene and the like. The olefin monomers can be substituted or unsubstituted and if substituted, the substituents can vary widely. If the polyolefin is to contain unsaturation, then the polyolefin can contain one or more nonconjugated-diene comonomers, such as 1,7-octadiene, 1,9-decadiene, 1,11-dodecadiene, 1,13-tetradecadiene, 7-methyl-1,6-octadiene, 9-methyl-1,8-decadiene and the like. Many polyolefins are thermoplastic. Polyolefins include, but are not limited to, polyethylene, polypropylene, polybutene, polyisoprene, and their various interpolymers.

In one or more embodiments, the polyolefin can comprise high-density polyethylene ("HDPE"), low-density polyethylene ("LDPE"), or blends thereof. In various embodiments, the polyolefin is a blend of HDPE and LDPE.

HDPE resins suitable for use are well known, commercially available, and can be prepared with Ziegler-Natta, chromium-based, constrained geometry, or metallocene catalysts in slurry reactors, gas-phase reactors, or solution reactors. The term "HDPE," as used herein, is an ethylene-based homopolymer or interpolymer having a density of at least 0.94 grams per cubic centimeter ("g/cm$^3$"), or from at least 0.94 to 0.98 g/cm$^3$, and a melt index (I$_2$) of from 0.1 to 25 grams per ten minutes ("g/10 min."). Polymer densities provided herein are determined according to ASTM International ("ASTM") method D792. Melt indices provided herein are determined according to ASTM method D1238. Unless otherwise noted, melt indices are determined at 190° C. and 2.16 Kg (i.e., I$_2$). The term "ethylene-based" denotes a polymer containing at least 50% by weight of ethylene monomer residues.

Suitable HDPEs can comprise ethylene and one or more C$_3$-C$_{20}$ α-olefin comonomers. The comonomer(s) can be linear or branched. Nonlimiting examples of suitable comonomers include propylene, 1-butene, 1-pentene, 4-methyl-1-pentene, 1-hexene, and 1-octene. HDPE interpolymers comprise at least 50, at least 70, at least 80, at least 90, or at least 95 weight percent ("wt %") of units derived from ethylene in polymerized form.

In an embodiment, the HDPE is a homopolymer or an ethylene/α-olefin copolymer with a density from 0.94 to 0.98 g/cm$^3$ and a melt index from 0.1 to 10 g/10 min. In another embodiment, the HDPE has a density from 0.96 to 0.98 g/cm$^3$ and a melt index from 0.1 to 10 g/10 min. In still another embodiment, the HDPE has a density from 0.96 to 0.97 g/cm$^3$ and a melt index from 0.1 to 10 g/min. In yet another embodiment, the HDPE has a density from 0.96 to 0.98 g/cm$^3$ and a melt index from 1.0 to 10.0 g/10 min.

Nonlimiting examples of suitable, commercially available HDPEs include, but are not limited to, DOW High Density Polyethylene resins; CONTINUUM™, UNIVAL™, and AXELERON™ high-density polyethylene resins; ELITE™ 5960 G; HDPE KT 10000 UE; HDPE KS 10100 UE; and HDPE 35057E, each available from The Dow Chemical Company Midland, Mich., USA; SURPASS™ available from Nova Chemicals Corporation, Calgary, Alberta, Canada; BS2581 available from Borealis; Hostalen ACP 5831D available from Lyondell/Basell; RIGIDEX™ HD5502S available from INEOS Olefins & Polymers Europe; SABIC™ B5823 and SABIC™ B5421 available from Sabic; and HDPE 5802 and BM593 available from Total.

The LDPE resins suitable for use herein are also well known, commercially available, and made by any one of a wide variety of processes including, but not limited to, solution, gas or slurry phase, and high pressure tube or autoclave. The LDPE also can be homogeneous or heterogeneous with respect to comonomer distribution. Homogeneous LDPEs usually have an essentially uniform comonomer distribution. Heterogeneous LDPEs, on the other hand, do not have a uniform comonomer distribution.

The LDPEs can have a broad molecular weight distribution, characterized by a polydispersity (Mw/Mn) greater than 3.5, or a narrow molecular weight distribution, characterized by a polydispersity in the range of about 1.5 to about 3.5. Mw is defined as weight-average molecular weight, and Mn is defined as number-average molecular weight. Mw and Mn can be determined according to gel-permeation chromatography, according to the description provided in the Test Methods section, below. They can be a single type of polyethylene or a blend or mixture of more than one type of polyethylene. Thus, they may be characterized by either single or multiple DSC melting points. The LDPEs can have a density in the range of 0.865 to 0.930 g/cm$^3$, or from 0.900 to 0.925 g/cm$^3$. They also can have a melt index ($I_2$) in the range of from 0.1 to 50 g/10 min.

Typical catalyst systems, which can be used to prepare suitable LDPEs, are magnesium/titanium-based catalyst systems, which can be exemplified by the catalyst system described in U.S. Pat. No. 4,302,565 (heterogeneous polyethylenes); vanadium-based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); chromium-based catalyst systems, such as that described in U.S. Pat. No. 4,101,445; metallocene catalyst systems, such as that described in U.S. Pat. Nos. 4,937,299 and 5,317,036 (homogeneous polyethylenes); or other transition-metal catalyst systems. Many of these catalyst systems are often referred to as Ziegler-Natta catalyst systems or Phillips catalyst systems. Catalyst systems, which use chromium or molybdenum oxides on silica-alumina supports, can be included here.

Typical processes for preparing the polyethylenes are also described in the aforementioned patents. Typical in situ polyethylene blends, processes, and catalyst systems are described in U.S. Pat. Nos. 5,371,145 and 5,405,901. The LDPEs can include low-density homopolymers of ethylenemade by high-pressure processes ("HP-LDPE"). A conventional high-pressure process is described in Introduction to Polymer Chemistry, Stille, Wiley and Sons, New York, 1962, pages 149 to 151. High-pressure processes are typically free-radical-initiated polymerizations conducted in a tubular reactor or a stirred autoclave. In a stirred autoclave, the pressure can be in the range of about 10,000 to 30,000 psi (about 69 to about 207 MPa) and the temperature can be in the range of about 175 to about 250° C., and in a tubular reactor, the pressure can be in the range of about 25,000 to about 45,000 psi (about 170 to about 310 MPa) and the temperature can be in the range of about 200 to about 350° C.

Commercially available LDPE resins include, but are not limited to, DOW Low Density Polyethylene resins available from The Dow Chemical Company, such as AXELERON™ LDPEs (e.g., AXELERON™ CX 1258 NT) and, in general, any fractional melt flow index ("MFI") resin for use in heavy duty bags or agricultural films, such as those available from Borealis, Basel, Sabic, and others.

The HDPE/LDPE mixtures or blends of the present invention may be prepared by any suitable means known in the art, such as dry blending in a pelletized form in desired proportions followed by melt blending in a suitable apparatus, such as a screw extruder or a BANBURY™ mixer. Dry-blended pellets may be directly melt processed into a final solid state article by, for example, extrusion or injection molding. The blends may also be made by direct polymerization. Direct polymerization may use, for example, one or more catalysts in a single reactor or two or more reactors in series or parallel while varying at least one of operating conditions, monomer mixtures, and catalyst choice.

The amount of HDPE in the foamable polyolefin composition, based on the total weight of the composition, can be at least 45 wt %, at least 55 wt %, or at least 60 wt %. The amount of HDPE in the foamable polyolefin composition, based on the total weight of the composition, can be 95 wt % or less, 85 wt % or less, or 80 wt % or less.

The amount of LDPE in the foamable polyolefin composition, based on the total weight of the composition, can be at least 4 wt %, at least 14 wt %, or at least 19 wt %. The amount of LDPE in the foamable polyolefin composition, based on the total weight of the composition, can be 54 wt % or less, 44 wt % or less, or 39 wt % or less.

The HDPE component of the blend can comprise two or more grades of HDPE, and the LDPE component of the blend can comprise two or more grades of LDPE. The HDPE/LDPE blend can have a melt index ($I_2$) ranging from 0.1 to 4 g/10 min., or from 0.15 to 4 g/10 min.

Nucleator

As noted above, the foamable polyolefin composition comprises a nucleator. The nucleator useful herein comprises a combination of azodicarbonamide ("ADCA") with a citrate mixture comprising, consisting essentially of, or consisting of (1) a first component consisting of at least one of citric acid and an alkali metal citrate, and (2) a second component consisting of at least one of an alkali metal citrate, a di-alkali metal hydrogen citrate, an alkali metal di-hydrogen citrate, and an alkali metal bicarbonate. Of course, if the first component of the mixture is solely an alkali metal citrate, then the second component of the mixture is not solely an alkali metal citrate. In other words, the citrate mixture is not solely composed of alkali metal citrates. In various embodiments, the alkali metal in each of the compounds identified in the first and second components is sodium. In one or more embodiments, the citrate mixture consists of citric acid and/or sodium citrate as the first component with sodium bicarbonate as the second component. The weight ratio of first component to second component of the citrate mixture can be from 1:99 to 99:1, or from 20:80 to 80:20. Typically, the shape and size of the component parts of the citrate mixture are irregular and 2 to 50 microns, respectively.

In an embodiment, the citrate mixture can be a mixture of sodium bicarbonate, sodium citrate, and disodium hydrogen citrate, where sodium bicarbonate constitutes in the range of from 50 to 80 wt % of the citrate mixture, with sodium citrate and disodium hydrogen citrate constituting the remainder.

In an embodiment, the citrate mixture can be a mixture of citric acid and sodium dihydrogen citrate present in a weight ratio of about 60:40.

The citrate mixture may also contain various additives such as dispersant or wetting agents (e.g., long-chain alkanes), and thermal stabilizers (e.g., calcium phosphate). Such additives may be present in an amount ranging from 1 to 15 wt %, or from 5 to 10 wt %, based on the total weight of the citrate mixture. Additionally, the nucleator may optionally contain one or more additional nucleating components. Examples of such additional nucleating components include, but are not limited to, fluororesin particles (e.g., polytetrafluoroethylene ("PTFE")), 4,4'-oxybisbenzenesulfonylhydrazide ("OBSH"), and the like and combinations of two or more thereof.

In various embodiments, the nucleator can be present in the foamable polyolefin composition in an amount ranging from 0.01 to 1 wt %, from 0.05 to 0.6 wt %, from 0.1 to 0.4 wt %, from 0.1 to 0.2 wt %, or from 0.14 to 0.16 wt %, based on the total weight of the foamable polyolefin composition. Additionally, the ADCA and citrate mixture can be present in an ADCA-to-citrate mixture weight ratio ranging from less than 80:20 to greater than 15:85, from 60:40 to 20:80, or from 3:2 to 2:3.

In one or more embodiments, the ADCA can be present in the foamable polyolefin composition in an amount ranging from 0.03 to 0.09 wt %, or from 0.06 to 0.09 wt %, based on the total weight of the foamable polyolefin composition. Additionally, the citrate mixture can be present in the foamable polyolefin composition in an amount ranging from 0.06 to 0.12 wt %, or from 0.06 to 0.09 wt %, based on the total weight of the foamable polyolefin composition.

The nucleator can be added to the foamable polyolefin composition by any conventional means. The nucleator can be added neat, in combination with one or more other additives, e.g., antioxidant, cell stabilizer, etc., or as part of a masterbatch. The nucleator is typically added as a mixture of ADCA and citrate mixture, but the ADCA and citrate mixture can be added separately and the combined nucleator formed in situ within the foamable polyolefin composition. The nucleator can be mixed with the foamable polyolefin composition to achieve an essentially homogeneous dispersion of nucleator in the foamable polyolefin composition and to this end, batch mixing, e.g., through the use of a Banbury mixer, may be employed. Alternatively, the foamable polyolefin composition can be prepared in a continuous mixer such as through the use of a twin-screw extruder or a BUSS™ kneader. If the nucleator is first mixed with the foamable polyolefin composition in an extruder, then it is typically added to the foamable polyolefin composition prior to injection of the gas for foaming.

Use of the above-described nucleator can produce a higher performance product as compared to a product produced using either ADCA or a citrate mixture alone as the nucleator. The products exhibit enhanced properties in terms of expansion ratio, cell size, and cell size uniformity, as well as surface smoothness. In this hybrid nucleating agent, both ADCA and citrate are considered "active" nucleating agents.

The synergic effect between these two nucleating agents results in a higher nuclei density and a foamed product with smaller cell size as compared to processes using and products produced by the use of neat citrate mixture or neat ADCA alone as the nucleating agent. Particularly, in various embodiments, a foamed polyolefin composition prepared by the process described herein can have an average cell size of less than 0.360 mm, 0.357 mm or less, or in the range of from 0.330 to 0.360 mm, or from 0.333 to 0.357 mm. Average cell size is determined according to the procedure provided in the Test Methods section, below.

Additives

The foamable polyolefin composition may contain one or more additives as necessary or desired. Representative additives include but are not limited to, processing aids, lubricants, stabilizers (antioxidants), foaming aids, nucleating agents, surfactants, flow aids, viscosity control agents, coloring agents, copper inhibitors, and the like. These additives can be added to the polymer(s) either before or during processing. The amount of any particular additive in the polyolefin composition can be from 0.01 to 1 wt %, from 0.01 to 0.5 wt %, or from 0.01 to 0.3 wt %, and the total amount of additives in the polyolefin composition, if present at all, can be from 0.01 to 5 wt %, from 0.01 to 2 wt %, or from 0.01 to 1 wt %.

Foaming Agent

The foaming agent is one or more suitable for the extrusion temperature, foaming conditions, foam-forming method, and the like. When an insulating foam layer in the final form is to be formed simultaneously with extrusion forming, for example, an inert gas such as nitrogen, a carbon gas (e.g., CO, $CO_2$, etc.), helium, argon and the like, hydrocarbon such as methane, propane, butane, pentane and the like, halogenated hydrocarbons such as dichlorodifluoromethane, dichloromonofluoromethane, monochlorodifluoromethane, trichloromonofluoromethane, monochloropentafluoroethane, trichlorotrifluoroethane and the like can be used. The amount of foaming agent to be used can vary. Typically, it can be 0.001-0.1 part by weight, or 0.005-0.05 part by weight, per 100 parts by weight of the polyolefin composition to be foamed. The foaming agent may be mixed with an organic polymer to be foamed in advance or may be supplied into an extruder from a foaming agent supply opening formed on the barrel of the extruder.

Foaming Process

The foamable polyolefin composition of this invention can be foamed using anyconventional or hereafter-discovered methods and equipment. Typically, a foam is produced by extruding the polyolefin composition containing a nucleator using an extruder operated under foaming extrusion conditions, e.g., injection of a foaming agent while the composition is in a high-pressure zone and then extruding the composition to a low-pressure zone. Foaming processes are further described by C. P. Park in *Polyolefin Foam*, Chapter 9, *Handbook of Polymer Foams and Technology*, edited by D. Klempner and K. C. Frisch, Hanser Publishers (1991).

In one embodiment, a typical extrusion foaming process uses an atmospheric gas (e.g., $CO_2$) to produce a foamed cable insulation as described in CA 2 523 861 C, *Low Loss Foam Composition and Cable Having Low Loss Foam Layer*. Dissolution of the foaming gas into the polymer melt is governed by Henry's law as reported for example in the work of H. Zhang (below) and others. Solubility is a function of the saturation pressure and the Henry's law constant, which itself is a function of temperature. H. Zhang, *Scale-Up of Extrusoin Foaming Process for Manufacture of*

Polystyrene Foams Using Carbon Dioxide, Master's Thesis, University of Toronto, 2010 (https://tspace.library.utoronto.ca/bitstream/1807/25536/1/Zhang_Hongtao_201011_MASc_thesis.pdf). Also see *Foam Extrusion: Principles and Practice* by Shau-Tarng Lee, editor.

Given the importance of adequate pressure control during foaming extrusion, a suitable process would be the one commercially referred to as the MuCell™ process, in which adequate pressures are built using specific hardware design for effective nucleation as reported in U.S. Pat. No. 6,284, 810B1. The method disclosed in this publication relies solely on high pressure drops (dP/dt) for self-nucleation of the foaming gas in the absence of an "auxiliary nucleating agent" (Col. 4, line 25-30).

Embodiments of the Invention

In one embodiment the foamable polyolefin composition comprises at least two polyolefins.

In one embodiment the foamable polyolefin composition consists of two polyolefins.

In one embodiment the polyolefins of the foamable polyolefin composition are an HDPE and an LDPE.

In one embodiment the foamable polyolefin composition includes at least one nucleator.

In one embodiment the foamable polyolefin composition includes at least one of an antioxidant and a cell stabilizer.

In one embodiment the foamable polyolefin composition comprises HDPE, LDPE, ADCA and a citrate mixture.

In one embodiment the foamable polyolefin composition comprises HDPE, LDPE and a nucleator consisting of (A) ADCA, and (B) a mixture of (1) a first component consisting of at least one of citric acid and an alkali metal citrate, and (2) a second component consisting of at least one of an alkali metal citrate, a di-alkali metal hydrogen citrate, an alkali metal dihydrogen citrate and an alkali metal bicarbonate with the proviso that if the first component of the mixture is solely an alkali metal citrate, then the second component of the mixture is not solely an alkali metal citrate.

In one embodiment the citrate mixture of the foamable polyolefin composition of any of the preceding embodiments comprises sodium bicarbonate, sodium citrate and disodium hydrogen citrate.

In one embodiment the citrate mixture of the foamable polyolefin composition of any of the preceding embodiments comprises sodium dihydrogen citrate and citric acid.

DEFINITIONS

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Wire" means a single strand of conductive metal, e.g., copper or aluminum, or a single strand of optical fiber.

"Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496, 629 and 6,714,707.

"Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

"Nucleator," "nucleating agent," and like terms mean a substance, typically a small particle, that provides a nucleation site or location for bubble formation within a polymer melt. Nucleating agents are used to enhance the cell structure of foamed polymers.

"Polymer" means a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers (three different monomers), tetrapolymers (four different monomers), etc.

"Homopolymer" denotes a polymer comprising repeating units derived from a single monomer type, but does not exclude residual amounts of other components used in preparing the homopolymer, such as chain transfer agents.

"Masterbatch" and like terms denote a concentrated mixture of additives in a carrier resin. In the context of this invention, a masterbatch comprises a concentrated mixture of nucleator in a polyolefin resin. The masterbatch allows for an efficient addition and dispersion of the nucleator to and in the polyolefin. The manufacture and use of masterbatches are well known to those skilled in the art of manufacturing and fabricating plastics and foam articles.

"Residue," when referring to a monomer, means that portion of a monomer molecule which resides in a polymer molecule as a result of being polymerized with another monomer or comonomer molecule to make the polymer molecule.

TEST METHODS

Density

Density is determined according to ASTM D792.

Melt Index

Melt index, or $I_2$, is measured in accordance with ASTM D1238, condition 190° C./2.16 kg, and is reported in grams eluted per 10 minutes.

Molecular Weight Distribution

A high-temperature gel permeation chromatography ("GPC") system is employed, equipped with Robotic Assistant Deliver ("RAD") system for sample preparation and sample injection. The concentration detector is an Infra-red detector (IR4) from Polymer Char Inc. (Valencia, Spain). Data collection is performed using Polymer Char DM 100 Data acquisition box. The carrier solvent is 1,2,4-trichlorobenzene ("TCB"). The system is equipped with an on-line solvent degas device from Agilent. The column compartment is operated at 150° C. The columns are four Mixed A LS 30-cm, 20-micron columns. The solvent is nitrogen-purged TCB containing approximately 200 ppm 2,6-di-t-butyl-4-methylphenol ("BHT"). The flow rate is 1.0 mL/min, and the injection volume is 200 μl. A 2 mg/mL sample concentration is prepared by dissolving the sample in nitrogen-purged and preheated TCB (containing 200 ppm BHT) for 2.5 hours at 160° C. with gentle agitation.

The GPC column set is calibrated by running twenty narrow molecular weight distribution polystyrene ("PS") standards. The molecular weight ("MW") of the standards ranges from 580 to 8,400,000 g/mol, and the standards are contained in six "cocktail" mixtures. Each standard mixture has at least a decade of separation between individual molecular weights. The equivalent polypropylene ("PP") molecular weights of each PS standard are calculated by using the following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N.Y. Hellman, P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad (1)$$

where $M_{PP}$ is PP equivalent MW, $M_{PS}$ is PS equivalent MW, log K and a values of Mark-Houwink coefficients for PP and PS are listed below.

| Polymer | a | log K |
| --- | --- | --- |
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$Mn = \frac{\sum_i Wf_i}{\sum_i \left(\frac{Wf_i}{M_i}\right)}, \quad (2)$$

$$Mw = \frac{\sum_i (Wf_i * M_i)}{\sum_i Wf_i}, \quad (3)$$

where $Wf_i$ and $M_i$ are the weight fraction and molecular weight of elution component i, respectively.

Foaming Process

Foaming is conducted on a single-screw extruder equipped with a gas-injection system. The screw diameter is 50 millimeters (mm) with a length-to-diameter ratio (L/D) of 40. The gas-injection point is located at the middle of the screw, and $CO_2$ is employed as the blowing agent. The capillary die has a diameter of 3 mm. The temperature profile is 140/175/180(gas injection)/170/145(static mixer)/143(die). HDPE, LDPE, and nucleating agent are dry blended first then fed on the upstream of the extruder. Alternatively, the ingredients can be compounded into "all in one" formulation and then foamed on the gas-injected extruder. The extruded foam rod has a diameter of 13-16 mm depending on the expansion ratio of each formulation.

Characterization of Extruded Foam Rod

For each characterization, three extruded rods are collected at intervals after the extrusion foam process has stabilized. During the cell density analysis, described below, a single slice is cut from each of the three rods. Characterization results from the three rods are averaged.

Expansion Ratio

The expansion ratio is calculated based on the density of a sample before and after foaming. Densities are measured according to ASTM D792.

Expansion ratio=$(1-\rho_{foam}/\rho_{solid})*100\%$

Cell Density

The foamed sample is fractured utilizing liquid nitrogen and then slices are cut out using a razor blade. The slices are coated with platinum using an EMITECH™ K575X coater before scanning electron microscopy (SEM) analysis. The SEM images are acquired on an FEI Nova NanoSEM 630 SEM by Everhart-Thornley detector (ETD) and Through Lens Detector (TLD) at an accelerating voltage of 5 kV, working distance around 6.5 mm and spot size of 5. The cell density and average cell size are obtained through the analysis of the SEM photographs using the below equations.

The cell density of the foamed article can be calculated by the following Equation:

$$N_f = \left(\frac{n_c M_c^2}{A_c}\right)^{3/2}$$

where $N_f$ represents cell number per cubic centimeter volume in the foamed article, $n_c$ is the cell number in the view area of SEM picture, $A_c$ is the area of SEM picture, and $M_c$ is the magnification.

Average Cell Size

D, which is the average the cell size, can be calculated by the following Equation:

$$D = \left(\frac{6V_t^2}{\pi N_f}\right)^{1/3}$$

where, $V_t$ represents the expansion ratio of the foamed article.

Crush Resistance

Crush resistance of the foamed rod at 30% strain is determined by ASTMD1621. The test specimen should be cut from an extruded rod with a length of twice its diameter, and then specimen is placed between the surfaces of compression tool. Adjust the crosshead of the testing machine until it just contacts the top of the compression tool plunger. The speed of testing (motion of the grips) is around 1.3 mm/min. Record the complete compressive load-compressive strain curves. The compressive load at 30% compressive strain is compared.

MATERIALS

The following materials are employed in the Examples, below.

AXELERON™ CX 6944 NT is a high-density polyethylene ("HDPE") having a density of 0.965 g/cm³ and a melt index ($I_2$) of 8.0 g/10 min., which is commercially available from The Dow Chemical Company, Midland, Mich., USA.

AXELERON™ CX 1258 NT is a low-density polyethylene ("LDPE") having a density of 0.922 g/cm³ and a melt index ($I_2$) of 6.0 g/10 min., which is commercially available from The Dow Chemical Company, Midland, Mich., USA.

HYDROCEROL™ CF is an endothermic-type nucleating agent that is a mixture of sodium bicarbonate, sodium citrate and disodium hydrogen citrate, commercially available from Clariant Corporation. Sodium bicarbonate constitutes from 50 to 80 wt % of the agent. Some dispersant agent and wetting agent (e.g., long chain alkanes), are also included in HYDROCEROL™ CF to prevent particles from agglomerating and to improve dispersion in the polymer resin. This nucleating agent is used as received.

W280 is an endothermic-type nucleating agent that is mixture of citric acid (majority component) and sodium dihydrogen citrate. The agent also containsa thermal stabilizer (calcium phosphate) and dispersant agent and is commercially available from Changzhou Entermark Rubber-Plastic Co. Ltd. Calcium phosphate is present in an amount of about 7 wt % of the agent. The concentration of the mixture of citric acid and sodium dihydrogen citrate is in the range of 80 to 90 wt %. The weight ratio between citric acid and sodium dihydrogen citrate is around 60:40. This nucleating agent is used as received.

Azodicarbonamide ("ADCA") is commercially available from Galata Chemicals.

EXAMPLES

Prepare seven Comparative Samples (CS1-CS7) and four Samples (S1-S4) according to the following procedure and the formulations provided in Table 1, below. First, the nucleating agents are made into a nucleating-agent masterbatch with a total loading of 10 wt % nucleating agent. The nucleating agents are dry blended together with LDPE, which is used as the base resin carrier. For instance, the nucleating-agent masterbatch for S1 has an ADCA loading of 6 wt % and a Hydrocerol loading of 4 wt %. Preparation of the nucleating-agent masterbatch is conducted on a twin-screw extruder.

Next, HDPE, LDPE and nucleating-agent masterbatch are compounded into an "all in one" formulation on a twin-screw extruder and then foamed on a gas-injection foaming extruder. The nucleating-agent masterbatch loading is 1.5 wt % for all formulations.

The physical foaming experiment is conducted on a single-screw extruder with gas-injection system. The screw diameter is 50 millimeters (mm) with a length-to-diameter (L/D) ratio of 40. The gas-injection point is located at the middle of the screw with $CO_2$ as the blowing agent. The temperature profile is 140/175/180(gas injection)/170/145 (static mixer)/143(die). The foamed product is obtained in the shape of a rod.

TABLE 1

Compositions of CS1-CS7 and S1-S4

|  | CS1 | CS2 | CS3 | CS4 | CS5 | CS6 | CS7 | S1 | S2 | S3 | S4 |
|---|---|---|---|---|---|---|---|---|---|---|---|
| HDPE (wt %) | 70 | 70 | 70 | 70 | 70 | 70 | 70 | 70 | 70 | 70 | 70 |
| LDPE (wt %) | 29.97 | 29.94 | 29.85 | 29.94 | 29.85 | 29.85 | 29.85 | 29.85 | 29.85 | 29.85 | 29.85 |
| ADCA (wt %) | 0.03 | 0.06 | 0.15 | — | — | 0.12 | 0.02 | 0.09 | 0.06 | 0.03 | 0.09 |
| Hydrocerol (wt %) | — | — | — | 0.06 | 0.15 | 0.03 | 0.13 | 0.06 | 0.09 | 0.12 | — |
| W280 (wt %) | — | — | — | — | — | — | — | — | — | — | 0.06 |
| Total: | 100 | 100 | 100 | 100 | 100 | 100 | 100 | 100 | 100 | 100 | 100 |

Analyze each of CS1-CS7 and S1-S4 according to the procedures described in the Test Methods section, above. The results are provided in Table 2, below.

TABLE 2

Properties of CS1-CS7 and S1-S4

|  | CS1 | CS2 | CS3 | CS4 | CS5 | CS6 | CS7 | S1 | S2 | S3 | S4 |
|---|---|---|---|---|---|---|---|---|---|---|---|
| Expansion ratio (%) | 78.2 | 79.2 | 80.4 | 78.3 | 78.8 | 81.3 | 76.2 | 80.7 | 78.9 | 76.5 | 78.1 |
| Average Cell Size (mm) | 0.439 | 0.401 | 0.362 | 0.432 | 0.385 | 0.374 | 0.391 | 0.333 | 0.336 | 0.343 | 0.357 |
| Crush Resistance (Compressive load), 30% Strain (N) | — | — | 303.2 | 277.6 | 307.2 | 255.3 | 286.1 | 276.1 | 280.6 | 270.5 | 291.6 |

As can be seen from the results provided in Table 2, above, the combination of ADCA with a mixture of (i) citric acid and/or sodium citrate, and (ii) one or more of its derivatives (e.g., sodium citrate, disodium hydrogen citrate, sodium dihydrogen citrate) and/or sodium bicarbonate has better foaming performance, e.g., finer cell size, than neat ADCA or a neat mixture of sodium citrate and bicarbonate. At an equivalent or lower loading of nucleating agent, the inventive process shows improved foaming performance, e.g., equivalent expansion ratio with smaller cell size.

The invention claimed is:

1. A process comprising the step:
  mixing a polyolefin with a nucleator to form a foamable polyolefin composition, the nucleator comprising:
    (A) azodicarbonamide ("ADCA"), and
    (B) a mixture selected from the group consisting of (a) a combination of sodium bicarbonate, sodium citrate, and disodium hydrogen citrate, wherein said sodium bicarbonate constitutes in the range of from 50 to 80 weight percent of said mixture with said sodium citrate and said disodium hydrogen citrate constituting the remainder, (b) a combination of citric acid and sodium dihydrogen citrate, wherein said citric acid and said sodium dihydrogen citrate are present in a weight ratio of about 60:40, and (c) mixtures thereof, wherein said ADCA and said mixture are present in an ADCA-to-mixture weight ratio ranging from less than 80:20 to greater than 15:85.

2. The process of claim 1, wherein said polyolefin comprises a combination of high-density polyethylene ("HDPE") and low-density polyethylene ("LDPE").

3. The process of claim 2, wherein said polyolefin consists of a combination of HDPE and LDPE.

4. The process of claim 2, wherein said HDPE is present in an amount ranging from 45 to 95 weight percent based on the total weight of said foamable polyolefin composition, wherein said LDPE is present in an amount ranging from 4 to 54 weight percent based on the total weight of said foamable polyolefin composition.

5. The process of claim 1, wherein said ADCA is present in an amount ranging from 0.03 to 0.09 weight percent, based on the total weight of said foamable polyolefin composition, wherein said mixture is present in an amount ranging from 0.06 to 0.12 weight percent, based on the total weight of said foamable polyolefin composition.

6. The process of claim 1, further comprising the step of mixing an additive selected from the group consisting of antioxidants, cell stabilizers, and combinations thereof with the polyolefin and nucleator.

* * * * *